US008965966B2

(12) United States Patent
Memar-Zahedani et al.

(10) Patent No.: US 8,965,966 B2
(45) Date of Patent: Feb. 24, 2015

(54) SYSTEM AND METHOD FOR LOGGING A SCHEDULER

(75) Inventors: Sasan Memar-Zahedani, Bammental (DE); Andreas Dahl, Rauenberg (DE)

(73) Assignee: SAP SE, Walldorf, DE (US)

( * ) Notice: Subject to any disclaimer, the term of this patent is extended or adjusted under 35 U.S.C. 154(b) by 80 days.

(21) Appl. No.: 12/969,018

(22) Filed: Dec. 15, 2010

(65) Prior Publication Data

US 2012/0158838 A1 Jun. 21, 2012

(51) Int. Cl.
| G06F 15/16 | (2006.01) |
| G06F 9/48 | (2006.01) |
| G06F 11/07 | (2006.01) |
| G06F 11/32 | (2006.01) |
| G06F 11/34 | (2006.01) |

(52) U.S. Cl.
CPC .......... *G06F 9/4881* (2013.01); *G06F 11/3476* (2013.01); *G06F 11/0709* (2013.01); *G06F 11/0769* (2013.01); *G06F 11/327* (2013.01)
USPC ....................................................... 709/204

(58) Field of Classification Search
USPC .......... 709/204, 220, 227, 229; 718/100–102, 718/103
See application file for complete search history.

(56) References Cited

U.S. PATENT DOCUMENTS

| 5,872,966 | A | * | 2/1999 | Burg | 719/313 |
| 7,366,175 | B2 | * | 4/2008 | Stacey et al. | 370/395.1 |
| 7,774,298 | B2 | | 8/2010 | Trivedi et al. | |
| 2001/0054070 | A1 | * | 12/2001 | Savage et al. | 709/204 |
| 2006/0004833 | A1 | * | 1/2006 | Trivedi et al. | 707/102 |
| 2006/0112175 | A1 | * | 5/2006 | Sellers et al. | 709/223 |
| 2006/0129692 | A1 | * | 6/2006 | Lassen et al. | 709/230 |
| 2007/0074150 | A1 | * | 3/2007 | Jolfaei et al. | 717/103 |
| 2007/0143761 | A1 | * | 6/2007 | Deng | 718/103 |
| 2007/0271570 | A1 | * | 11/2007 | Brown et al. | 718/105 |
| 2009/0175591 | A1 | * | 7/2009 | Gondhalekar et al. | 386/83 |
| 2009/0210547 | A1 | * | 8/2009 | Lassen et al. | 709/230 |
| 2009/0276781 | A1 | * | 11/2009 | Chan et al. | 718/103 |
| 2009/0288087 | A1 | * | 11/2009 | Ringseth et al. | 718/102 |
| 2009/0288095 | A1 | * | 11/2009 | Donadeo | 718/105 |
| 2009/0300628 | A1 | * | 12/2009 | Patil et al. | 718/102 |
| 2009/0313368 | A1 | * | 12/2009 | Hollebeek et al. | 709/223 |
| 2010/0042683 | A1 | * | 2/2010 | Fricke et al. | 709/203 |
| 2011/0019572 | A1 | * | 1/2011 | Lemaire et al. | 370/252 |
| 2011/0054070 | A1 | * | 3/2011 | Xing et al. | 523/176 |
| 2011/0060981 | A1 | * | 3/2011 | Piersol et al. | 715/209 |
| 2011/0087731 | A1 | * | 4/2011 | Wong et al. | 709/204 |
| 2011/0255551 | A1 | * | 10/2011 | Venables | 370/412 |
| 2011/0289503 | A1 | * | 11/2011 | Toub et al. | 718/102 |

* cited by examiner

*Primary Examiner* — Nicholas Jensen
*Assistant Examiner* — Berhanu Belete
(74) *Attorney, Agent, or Firm* — Brake Hughes Bellerman LLP (57) ABSTRACT

A computer system including instructions recorded on a non-transitory computer-readable storage medium and readable by at least one processor, the system including a logging module, a receiving module, and a transmission module. The logging module is configured to log information associated with a scheduler. The receiving module is configured to receive a request for information associated with the scheduler. The transmission module is configured to transmit information associated with the scheduler.

25 Claims, 9 Drawing Sheets

RFC Chain Analysis

Version 4 (March 2007)
○ 1 21 is4017n_PIA_10
1 application servers reached from a total of 1
Number of COMM_ADM Entries Read 21

| Hierarchy | TID Session | Server | Cl. Ser | Dest | Transmission Token | GUI | Roll in | Error |
|---|---|---|---|---|---|---|---|---|
| ▷ 🗇 80286338 | T00069M00 | ls4017n_PIA_10 | SERVER | | | | | |
| ▷ ☐ 79804868 | T00069M00 | ls4017n_PIA_10 | CLIENT | | ✓ | | | |
| ☐ 79804868 | T00057M00 | ls4017n_PIA_10 | SERVER | | | | | |
| ☐ 79859216 | T00057M00 | ls4017n_PIA_10 | CLIENT | | ✓ | | | |
| ▷ ☐ 79859216 | T00039M00 | ls4017n_PIA_10 | SERVER | | | | | |
| ☐ 79860245 | T00037M00 | ls4017n_PIA_10 | CLIENT | AI_RUNTIME_JCOSERVER | ✓ | | | |
| ☐ 80097467 | T00067M00 | ls4017n_PIA_10 | CLIENT | | ✓✓ | | | |
| ▷ ☐ 80097467 | T00032M00 | ls4017n_PIA_10 | SERVER | | | | | |
| ☐ 79861584 | T00032M00 | ls4017n_PIA_10 | CLIENT | | ✓ | | | |
| ▷ ☐ 79861584 | T00056M00 | ls4017n_PIA_10 | SERVER | | | | | |
| ☐ 79862612 | T00056M00 | ls4017n_PIA_10 | CLIENT | AI_RUNTIME_JCOSERVER | | | | |

FIG. 6

| High Priority Queue Loggig <<< Information maybe "out of date">>> | | | |
|---|---|---|---|
| Server Name | RC | Error Text | |
| ls4017n_PIA_10 | 3 | Quota for rdisp/rfc_max_own_used_wp used up | |
| Wdfd001178123_PIA_12 | 3 | CANT_GET_SERVER_INFO_2 | |

SYSTEM AND METHOD FOR LOGGING A SCHEDULER

TECHNICAL FIELD

This description relates to the logging and access of information associated with a scheduler.

BACKGROUND

At times, it can be desirable to analyze or monitor information and activities of a scheduler within a computer system. More specifically, it can be desirable to analyze or monitor information and activities associated with a scheduler that is operatively coupled to a queue and an application server. For example, analyzing or monitoring such information may provide information regarding errors or delays in the execution of tasks within a computer system.

For example, in some cases qRFC schedulers (inbound/outbound) cannot process logical units of work (LUWs) or process the LUWs with delays (for example in case of a resources failure). It can be difficult to determine the reasons for such problems. Often, the analysis of such problems is not very easy and involves support to find out the reason for the problem. Specifically, incidents may occur when schedulers are starting an asynchronous remote function call (RFC) with answer (in Group) and one of the following problems occurs: a system failure, a communication failure, or a resources failure.

Accordingly, it is desirable to provide a logging system that efficiently logs information associated with a scheduler. It is also desirable for such information to be readily available for users to review and analyze.

SUMMARY

According to one general aspect, a computer system including instructions recorded on a non-transitory computer-readable storage medium and readable by at least one processor, the system including a logging module, a receiving module, and a transmission module. In one embodiment, the logging module is configured to log information associated with a scheduler. The receiving module is configured to receive a request for information associated with the scheduler. The transmission module is configured to transmit information associated with the scheduler.

In some embodiments, the receiving module is configured to receive a request for information associated with the scheduler from a third party via a network connection. In some embodiments, the transmission module is configured to transmit information associated with the scheduler to a third party via a network connection.

In some embodiments, the scheduler is a high priority scheduler. In some embodiments, the high priority scheduler is operatively coupled to a queue and an application server.

In some embodiments, the scheduler is a first scheduler and the first scheduler is operatively coupled to a queue and an application server. In some embodiments, the queue is operatively coupled to a second scheduler.

In some embodiments, the information associated with the scheduler includes global information about the scheduler. In some embodiments, the information associated with the scheduler includes at least one of (a) an identification of the user for which the scheduler is running, (b) processing time of the scheduler, (c) an identification of an application server where the scheduler is running, and (d) a status of the scheduler.

In some embodiments, the information associated with the scheduler includes information regarding the runtime behavior of queue names that are associated with the scheduler.

According to another general aspect, a computer-implemented method for causing at least one processor to execute instructions is recorded on a computer-readable storage medium. In one embodiment, the method includes (a) logging information associated with a scheduler, (b) receiving a request for information associated with the scheduler, and (c) transmitting information associated with the scheduler.

In some embodiments, the receiving includes receiving a request for information associated with the scheduler from a third party via a network connection. In some embodiments, the transmitting includes transmitting information associated with the scheduler to a third party via a network connection.

In some embodiments, the scheduler is a high priority scheduler that is operatively coupled to a queue and an application server.

In some embodiments, the logging information associated with a scheduler includes logging information associated with at least one of (a) an identification of the user for which the scheduler is running, (b) a processing time of the scheduler, (c) an identification of an application server where the scheduler is running, and (d) a status of the scheduler.

In some embodiments, the logging information associated with a scheduler includes logging information associated with the runtime behavior of queue names that are associated with the scheduler.

According to another general aspect, a computer program product, the computer program product being tangibly embodied on a computer-readable medium and comprising instructions that, when executed, are configured to cause at least one processor to (a) log information associated with a scheduler, (b) receive a request for information associated with the scheduler, and (c) transmit information associated with the scheduler.

In some embodiments, the scheduler is a high priority scheduler that is operatively coupled to a queue and an application server.

In some embodiments, the information associated with the scheduler includes at least one of (a) an identification of the user for which the scheduler is running, (b) a processing time of the scheduler, (c) an identification of an application server where the scheduler is running, and (d) a status of the scheduler.

In some embodiments, the scheduler is a first scheduler and is operatively coupled to a queue and an application server. The queue is operatively coupled to a second scheduler.

In some embodiments, the information associated with the scheduler includes information associated with the runtime behavior of queue names that are associated with the scheduler.

The details of one or more implementations are set forth in the accompanying drawings and the description below. Other features will be apparent from the description and drawings, and from the claims.

DETAILED DESCRIPTION

Figure 1:
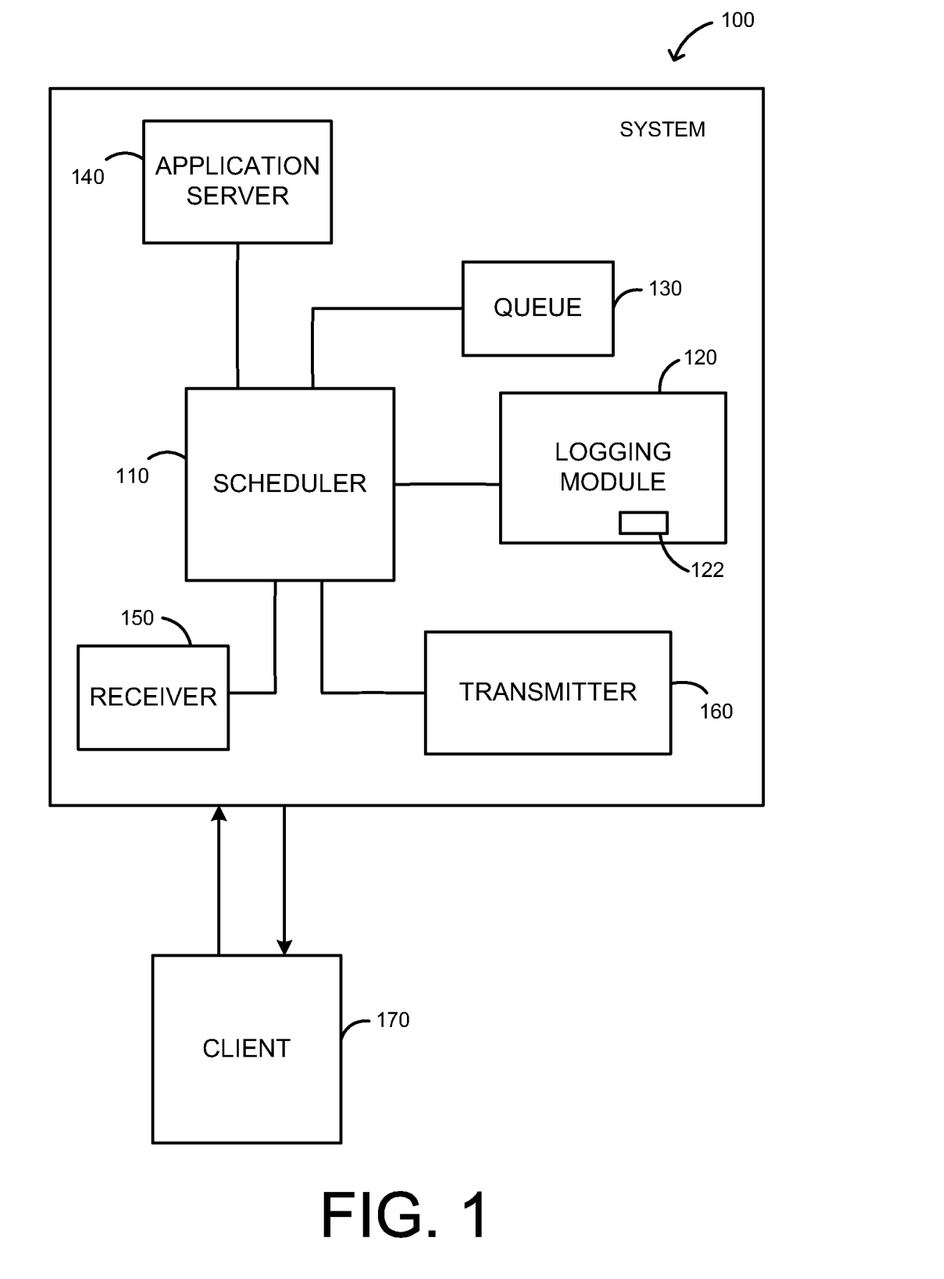
FIG. 1 is a block diagram of a system for logging a scheduler according to an embodiment.

FIG. 1 is a block diagram of a system 100 for logging information associated with a scheduler 110 and conveying such information. For example, as will be discussed in more detail below, the system 100 may be used to log global information regarding the scheduler 110 and may be used to log detailed information regarding the runtime behavior of specific queue names that are started by the scheduler 110.

In some embodiments, the system 100 includes a logging module 120. The logging module 120 is operatively coupled to the scheduler 110 and is configured to log information associated with the scheduler 110. More specifically, the logging module 120 is configured to store or cause to be stored information or details associated with the scheduler 110. For example, as described in detail below, in some embodiments, the logging module 120 is configured to log global information about the scheduler 120. In other embodiments, the logging module 120 is configured to log the runtime behavior of specific queues.

For example, in some embodiments, the logging module 120 is configured to log global information about the scheduler 110. Specifically, in some embodiments, the logging module 120 is configured to log global information about the scheduler 110 such as at least one of the following:

(1) for which user the scheduler 110 is running;
(2) technical user information in accordance to the user and terminal identification of the scheduler 110;
(3) processing time of the scheduler 110;
(4) passport identification (ID);
(5) the name or identification of the application server where the scheduler 110 is running;
(6) the status of the scheduler 110;
(7) the current status relating to the number of loop and successful processes of the scheduler 110; and
(8) the number of total dialog resources available to the server group for load balancing and the number of free resources.

In other embodiments, the logging module 120 is configured to log other global information about the scheduler 110.

In some embodiments, the logging module 120 is configured to log information about the runtime behavior of specific queue names that are started by the scheduler 110. For example, in some embodiments, the logging module 120 is configured to log information about the runtime behavior of the scheduler 110 such as at least one of the following:

(1) queue name of a specific inbound queue that is operatively coupled to the scheduler 110;
(2) queue status;
(3) navigation to existing qRFC monitor (SMQ2) to reuse the current status of qRFC LUWs within the current specific queue name;
(4) processing time of specific queue names, which are started by the scheduler 110;
(5) corresponding conversation ID (for identification of RFC communication partners);
(6) remote application server where the specific inbound queue is currently running;
(7) remote terminal identification of RFC server session (for example, this information may be relevant to find out very detailed technical RFC server session information in case of incidence); and
(8) root cause analysis of incidents and presentation of error texts in case of error when starting the queue.

In other embodiments, the logging module 120 is configured to log other information about the scheduler 110.

In some embodiments, the logging module 120 includes a memory 122. The memory 122 is configured to store the information that is logged by the logging module 120. For example, in some embodiments, the memory 122 is configured to store the global information about the scheduler 110 as well as the information about the runtime behavior of the scheduler 110.

The memory 122 can be of any known type of memory 122, such as a random-access memory (RAM) or a disk drive memory. Although not shown, in some embodiments, the memory 122 can be implemented as more than one memory component (e.g., more than one random-access memory (RAM) component or disk drive memory) within the system 100 or logging module 120. In some embodiments, the memory 122 can be, or can include, a non-local memory (e.g., a memory not physically included within the system 100). For example, the memory 122 can be, or can include, a memory shared by multiple client devices (not shown).

In some embodiments, the memory is, or includes, a shared memory of an application server 140 that is operatively coupled to the scheduler 110.

In some embodiments, the logging module 120 allows for a determination as to why LUWs have not been processed or why LUWs have been processed with delays. In some embodiments, such determination or analysis is relatively simple and does not involve support to find out the reason for the problem or the delay.

The system 100 also includes a receiver or a receiving module 150 and a transmitter or a transmission module 160. The receiver 150 may be configured to receive a request for information associated with the scheduler 110. In some embodiments, the receiver 150 is configured to receive a request for information from a client 170 outside of the system 100. In some embodiments, the receiver 150 is configured to receive a request for information associated with the scheduler 110 over a network, such as a wide-area network (WAN). In some embodiments, the logging of the scheduler 110 begins upon request of such information.

The transmitter 160 is configured to send information associated with the scheduler 110 to the client 170. In some embodiments, the transmitter 160 is configured to send information associated with the scheduler to the client 170 outside of the system 100. In some embodiments, the transmitter 160 is configured to send information associated with the scheduler 110 over a network, such as a wide-area network (WAN) or other network.

In some embodiments, the scheduler 110 is a qRFC scheduler. For example, in some embodiments, the scheduler 110 is an inbound scheduler and in other embodiments the scheduler 110 is an outbound scheduler.

As will be discussed in more detail below, in some embodiments, the scheduler 110 is operatively coupled to a queue 130 and the application server 140. In some embodiments, the queue 130 is an qRFC queue and messages are stored in the queue 130 to be processed by a scheduler, such as scheduler 110. In some embodiments, the application server 140 is configured to process the messages that are stored in the queue 130 and processed by the scheduler 110.

Figure 2:
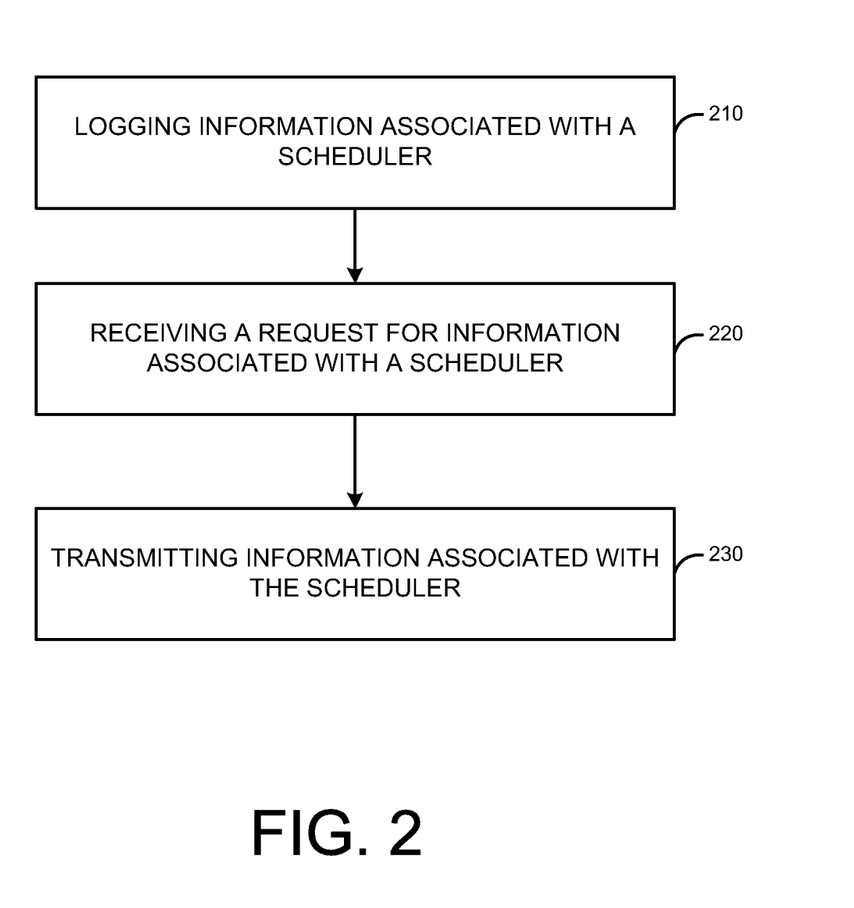
FIG. 2 is a flowchart illustrating example operations of the system of FIG. 1.

FIG. 2 is a flow chart illustrating example operations of the system 100 of FIG. 1. In the example of FIG. 2, a log of the scheduler 110 is created (210). For example, the logging module 120 is configured to log the activities of scheduler 110. In some embodiments, the logging of the scheduler 110 includes storing information associated with the scheduler 110 in a memory, such as memory 122 of FIG. 1. For example, in some embodiments, the creating a log of the scheduler 110 includes storing global information about the scheduler in a memory, such as memory 122 of FIG. 1. In other embodiments, the creating a log of the scheduler includes storing runtime behavior of specific queue names that are started by the scheduler 110. In some embodiments, the logging of the scheduler 110 begins upon a request. For example, the logging may begin when a request is made for such logging or the information associated with the logging.

A request for information associated with the scheduler is received (220). For example, the receiver 150 of FIG. 1 is configured to receive a request for information associated with the scheduler 110. In some embodiments, the request is received via a network connection.

Information associated with the scheduler 110 is transmitted to a client (230). For example, the transmitter 160 of FIG. 1 is configured to transmit information to a client 170. In some embodiments, the information is transmitted via a network connection.

Figure 3:
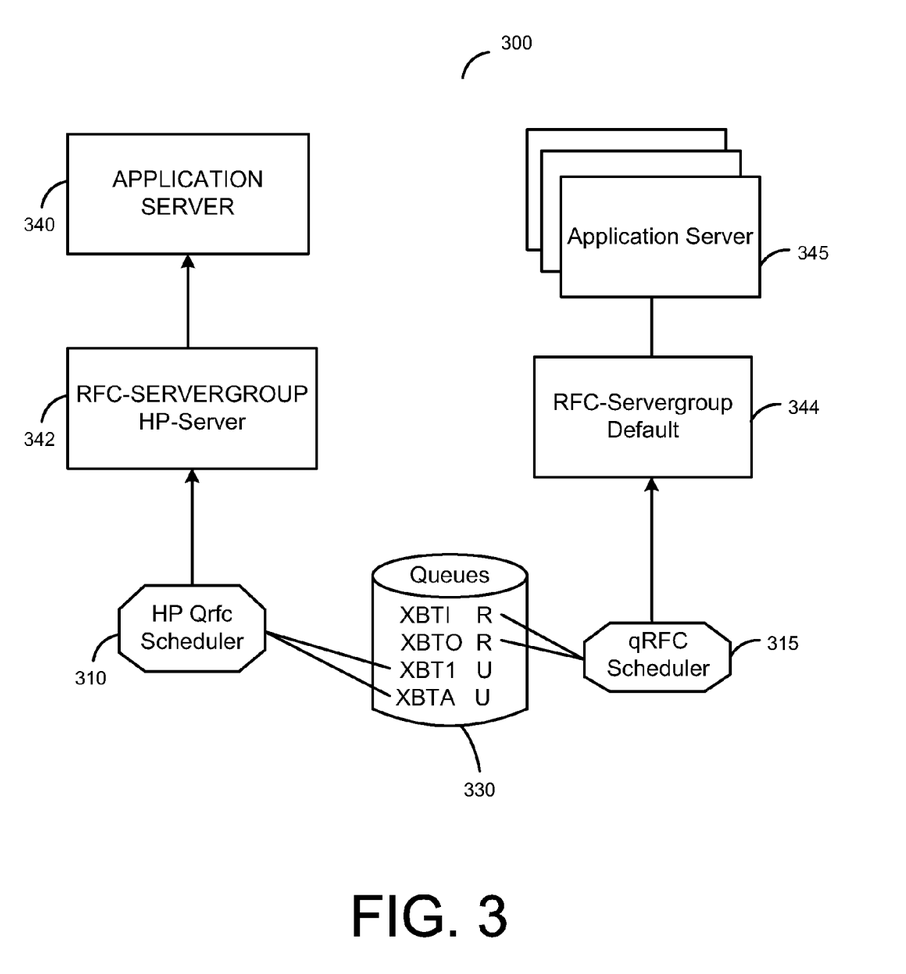
FIG. 3 is a schematic diagram illustrating an example system or implementation for logging a scheduler.

In some embodiments, a high priority scheduler is logged by a logging module. FIG. 3 is a schematic illustration of a system 300 that includes a high priority scheduler 310 that may be logged using a logging module (not illustrated).

High priority messages are scheduled or queued in qRFC queues and should be processed as fast as possible. In process integration (PI) all messages are scheduled in qRFC queues and processed by one scheduler instance. The scheduler uses the pre-defined server group for resource management and distributes all PI messages to the included application server (s) in the server group.

In some instances, a qRFC scheduler starts if the application uses the advanced business application programming (ABAP) statement COMMIT WORK in a qRFC context. For example, in some instances, a qRFC scheduler will perform the following at least one of the following steps to process the logical units of work (LUWs) of each qRFC application:
(1) select the already persisted data records from database;
(2) find the dependencies among different application queues, if necessary;
(3) sort the qRFC application messages; and
(4) assign qRFC application queues to generic queue name spaces.

Because the messages of several qRFC applications can be processed in parallel by the qRFC scheduler (for example at "commit work" the messages of supply chain management (SCM), PI and computer relationship management (CRM) applications can be processed by the same qRFC scheduler instance) and the qRFC scheduler is sorting the fetched data records in ascending order, it can happen that the qRFC scheduler is not able to process the PI messages in name space XBT1* in time (because a huge number of queues must be processed and the number of available resources is not large enough to process the PI messages accordingly) although they must be processed as high priority. In this case it might be possible that specific qRFC queues in name space AAA* cause delay of the processing of PI messages in queue name space XBT1*.

Additionally, in some instances, all registered qRFC queue name spaces are using the same resources for only one server group and qRFC applications can't use its own server group to be processed separately.

Accordingly, in one embodiment, these high priority queues and high priority messages are scheduled by a high priority scheduler. In some embodiments, a high priority scheduler will get its own resources and looks only for its registered (or high priority) queue names. In some embodiments, the high priority scheduler is an ABAP program, which can be started by an application using the ABAP statement "Submit Report and Return." For example, an application may call the high priority scheduler with the information about the name spaces of high priority queues and determine the alternative RFC server group for load balancing.

As illustrated in FIG. 3, in one embodiment, the system 300 includes a queue 330. In the illustrated embodiment, the queue 330 is a qRFC queue and is configured to queue messages. Some of the messages may be high priority messages.

In the illustrated embodiment, the high priority scheduler 310 and a second scheduler 315 are operatively coupled to the queue 330. Additionally, the high priority scheduler 310 is operatively coupled to an application server 340 through an RFC servergroup 342. Similarly, the second scheduler 315 is operatively coupled to an application server 345 (different than the application server 340) though an RFC servergroup 344 (different than the RFC servergroup 342).

In the illustrated embodiment, the high priority scheduler 310 processes the high priority messages in the queue 330. The second scheduler 315 processes all of the messages in the queue 330 that are not high priority. In some embodiments, the high priority scheduler 310 searches the queue 330 for messages that are identified as high priority. Messages may be identified as high priority for a number of reasons and in a number of ways. For example, a message may be identified as high priority because it needs to be addressed quickly or because it is going to consume a large amount of resources. Additionally, any type of identifier in the queue 330 may be used to identify the high priority messages.

In some embodiments, qRFC logging may be activated to analyze problems associated with processing the messages in a queue, such as the messages processed by the high priority scheduler. For example, in some embodiments, a system administrator is able to activate the qRFC logging on-demand and analyze the problem while processing PI high priority queue messages. In some embodiments, others, such as customers, are able to activate the qRFC logging and analyze any problems.

In the illustrated embodiment, the high priority scheduler 310 is implemented as a logging data provider and can write the log data records via an application programming interface (API) into a data collector, such as a shared memory, of the application server 340. In some embodiments, the high priority scheduler 310 runs by default with inactive logging. Accordingly, in some such embodiments, there is no negative impact on the performance of the system.

In some embodiments, the on-demand logging can be used to analyze more detailed information about internal functions of the high priority scheduler 310. For example, in some embodiments, a system administrator can activate the logging on-demand to acquire more detailed information about internal functions of the high priority scheduler 310 to, for example, find out the root cause of a problem. In some embodiments, a user, such as a customer, is able to activate the logging during the time the high priority scheduler 310 is running. In some embodiments, this activation of the logging and the associated request for information and receipt of information of the log may be made via a network communication. In some embodiments, this on-demand feature allows the analysis of an incident or presents a log runner in PI context.

In some embodiments, the high priority scheduler 310 is configured to process all PI messages, which are inserted during runtime in PI queues. Specifically, in some embodiments, the high priority scheduler 310 performs an iteration loop and re-process all PI messages of the queue 330 name spaces for as long as the high priority scheduler 310 is running For example, in some embodiments, the high priority scheduler 310 is provided with a list of PI specific queue names spaces while it is being started by a PI application. The high priority scheduler 310 may then search for specific queue names in the generic name spaces (for example, in some embodiments, it will find the specific queue name XBT10000 within generic queue name space XBT1*). The high priority scheduler will then start an asynchronous RFC with reply and try to process the PI messages.

In some embodiments, an attempt to start the high priority messages in the queue 330 can result in an error (for example communication/system or resource failure), which will be present in the high priority scheduler 310 with the appropriate human-readable error text.

In some embodiments, the system 300 is an ABAP system. In some such embodiments, if the system 300 does not have enough resources for processing of PI messages, the high priority scheduler 310 uses a fallback mechanism to process at least one PI message as asynchronous RFC call. Accordingly, an entry "X" for fallback in high priority scheduler 310 indicates the resource failure in a system and the system administrator can find the error using the error text.

In some embodiments, the logging of the high priority scheduler 310 logs when the high priority scheduler 310 does not process any PI messages. For example, in some embodiments, the system 300 logs the incidents of when the high priority scheduler 310 does not process any PI messages. In some such embodiments, such a log can be accessed on-demand or at a user's request.

In some embodiments, the system 300 provides on-demand logging of long term logical units of work of an application, such as a PI application. For example, in certain circumstances, qRFC schedulers (Inbound/Outbound) cannot process LUWs or process the LUWs with delays (for example in case of Resources Failure). In some embodiments, the logging of the high priority scheduler 310 allows customers and the support organization to find out the reason for the problem in an easy way.

For example, an incident may occur when a scheduler starts an asynchronous RFC Call with answer (in Group) and one of the following problems occur (a) a system failure, (b) a communication failure, or (c) a resources failure.

In some embodiments, in case of a system and/or a communication failure, an error text provided by the CPIC-layer is logged or sent to a data storage (like a database or a shared memory). In case of a resources failure, the logging may be used to show the kind of problem and provide customers with the error text that was the reason for the problem.

In some embodiments, the system raises an alert about the problem situation and the customer can register him/herself and receive notifications from the alerting framework of SAP computer center management system (CCMS). For example, the alerting framework may be used to aggregate equal error messages and make the reason for incidents available to customers.

In some embodiments, the logging of the high priority scheduler 310 provides a link to statistical records to determine some or all of the programs running with the same transaction identification. In some embodiments, the logging of the high priority scheduler 310 provides a link to statistical records to determine some or all of the programs running with the same SAP Passport-ID. Using the correlation with the statistical records the processing times and other helpful information using the READ API or CCMS group.

In some embodiments, the system 300 links the information about the transaction identification or the Passport ID to an SAP Solution Manager to localize the corresponding business process chain. Accordingly, in some embodiments, one may determine which program in the process chain had a long processing time. The correct application may be addressed to improve the processing time. Alternatively, a maximum allowed processing time may be increased in the system 300.

In some embodiments, the system 300 provides a linkage to other SAP analytical tools such as:

(1) Transaction SM5A (build the process chain using used conversation ID in an RFC connection);

(2) ST05 (using transaction ID, it is possible to search for SQL data records and analyze a performance issue);

(3) SAT (ABAP Trace);

(4) ST22 (search for ABAP runtime error, if the high priority scheduler or a involved thread of it is terminated while PI message processing); and (5) SM21 (SAP system log, using the user name, under that the high priority scheduler is currently running, it is possible to search for system log entries and does an exception analysis).

In some embodiments, the high priority scheduler 310 can be started on-demand by a system administrator and will record the specific logging data at processing of high priority queues of a PI application.

In some embodiments, some or all of the following categories of logging data can be displayed in the high priority scheduler 310:

A) Global Info about the High Priority Scheduler 310

For which user the high priority scheduler 310 is running; show the technical user information in accordance to the user and terminal ID of the high priority scheduler (similar to the information in the transaction SM04)

Processing time of the high priority scheduler 310

Passport ID (using this information one may be able to identify the process chain and use other SAP monitoring tools such as Solution Manager or SAP basis monitoring transactions for the tracking of business processes)

The name of the application server where the high priority scheduler 310 is running Status of the high priority scheduler 310

Current status relating to the number of loop and successful processes (qRFC LUWs)

Number of total dialog resources available to the server group for load balancing and the number of free resources (current status obtained by refreshing the monitor)

B) Detailed Information on the Runtime Behavior of Specific Queue Names which are Started by the High Priority Scheduler 310

Queue name of specific inbound queue

Queue status

Navigation to existing qRFC monitor (SMQ2) to reuse the current status of qRFC LUWs within current specific queue name Processing time of specific high priority queue names, which are started by the high priority scheduler Corresponding Conversation ID (for identification of RFC communication partners)

Remote application server where the specific inbound queue is currently running

Remote Terminal ID of RFC server session (for example, to find out very detailed technical RFC server session in case of incidence)

Root cause analysis of incidents and presentation of error texts in case of error when starting the high priority queues In some embodiments, the high priority scheduler 310 does not use an inbound queue RFC. Thus, it may be necessary to have a logging mechanism to analyze the incidents and processing times of every queue for inbound queue processing. In some embodiments, the high priority scheduler 310 is configured to activate the logging during the business process execution. In some embodiments, customers are able to activate the high priority scheduler to analyze the incidents or to determine or analyze any delays in process times.

In some embodiments, the logging of the high priority scheduler 310 is advantageous to get additional information about the scheduler 310. For example, in some embodiments, the logging may help provide answers to at least one of the following questions:
- Under which user is the inbound queue scheduler running?
- Which passport ID is being used?
- What is the root cause for incidents on the level of the scheduler itself?

Figure 4:
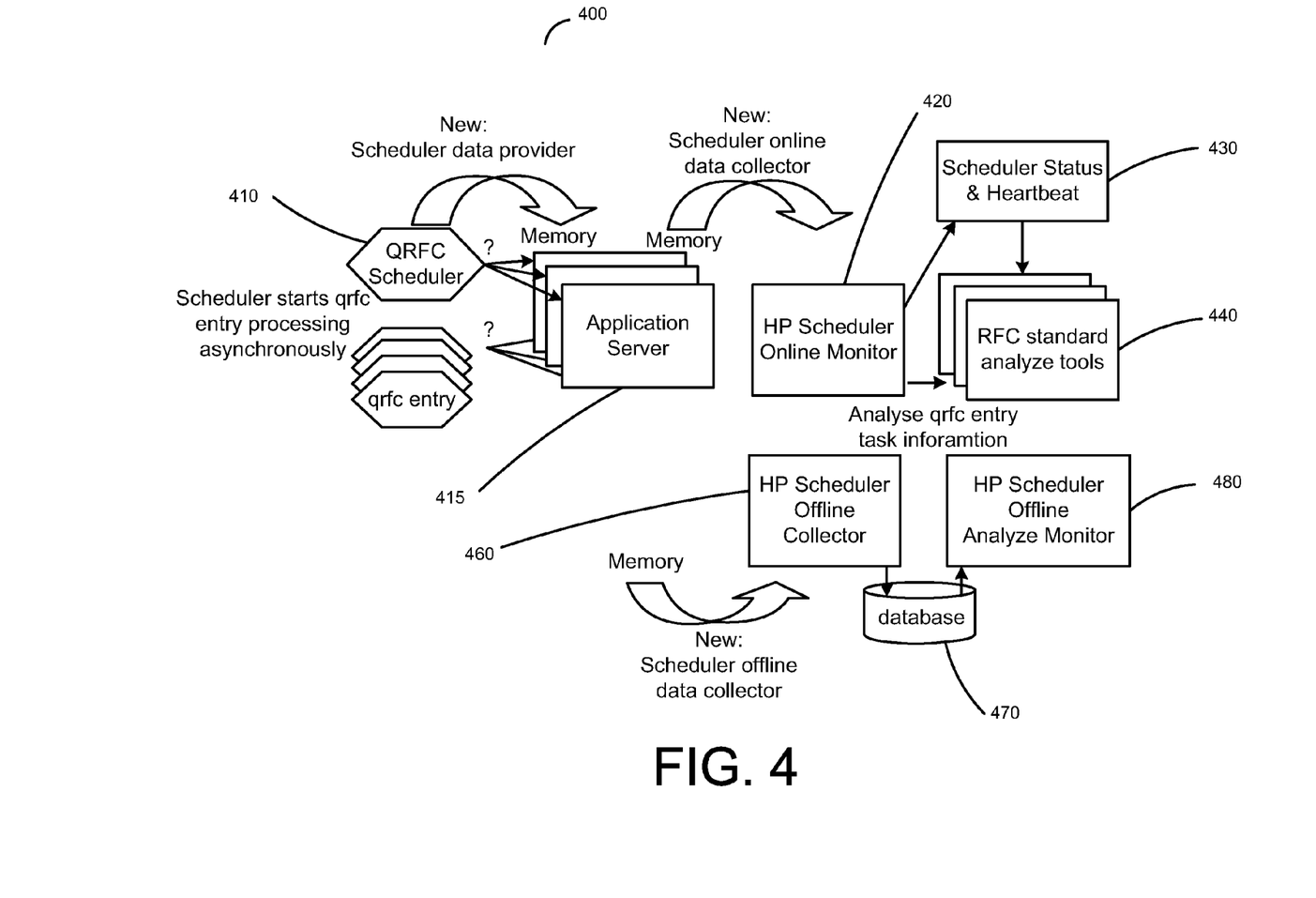
FIG. 4 is a schematic diagram illustrating an example system or implementation for logging a scheduler.

FIG. 4 illustrates various components and functionalities of a system according to an embodiment. The system 400 is configured to log the activities and information associated with a high priority qRFC scheduler 410. The logging, the receiving of the information of the log, and the analysis of the information of the log may be done in an online mode and an offline mode.

As illustrated in FIG. 4, in the online mode, the scheduler 410 writes information to a memory or a data collector (for example, via an API). In some embodiments, the data memory or data collector is associated with or a part of the application server 415. The information may be provided to a high priority online monitor 420. The online monitor is operatively coupled to a scheduler status module 430 and to a set of analytical tools 440.

In some embodiments, the scheduler status module 430 is configured to allow the system to provide real-time updates of the information of the scheduler 410 to the analytical tools 440. The analytical tools 440 may be used by a user to filter, interpret, and analyze the information associated with the scheduler 410.

In some embodiments, the online mode of analyzing the information associated with the scheduler 410 may be done in real time. In other words, information associated with the scheduler may be streaming and provide an accurate and current information regarding the scheduler 410.

As illustrated in FIG. 4, in the offline mode, the scheduler 410 writes to an offline data collector 460. The offline data collector 460 is operatively coupled to a database 470 which stores the information. The database 470 is operatively coupled to an offline analyze monitor 480. In some embodiments, the offline analyze monitor 480 may be used to interpret, sort, and analyze the information stored in the database 470 and associated with the scheduler 410.

In some embodiments, the offline mode may be used to analyze historical information associated with the scheduler 410.

FIGS. 5-9 are screen shots of an example log runner and incidents while PI message processing. In some embodiments, the processing time of each specific PI high priority queue can be acquired from the logging.

Figure 5:
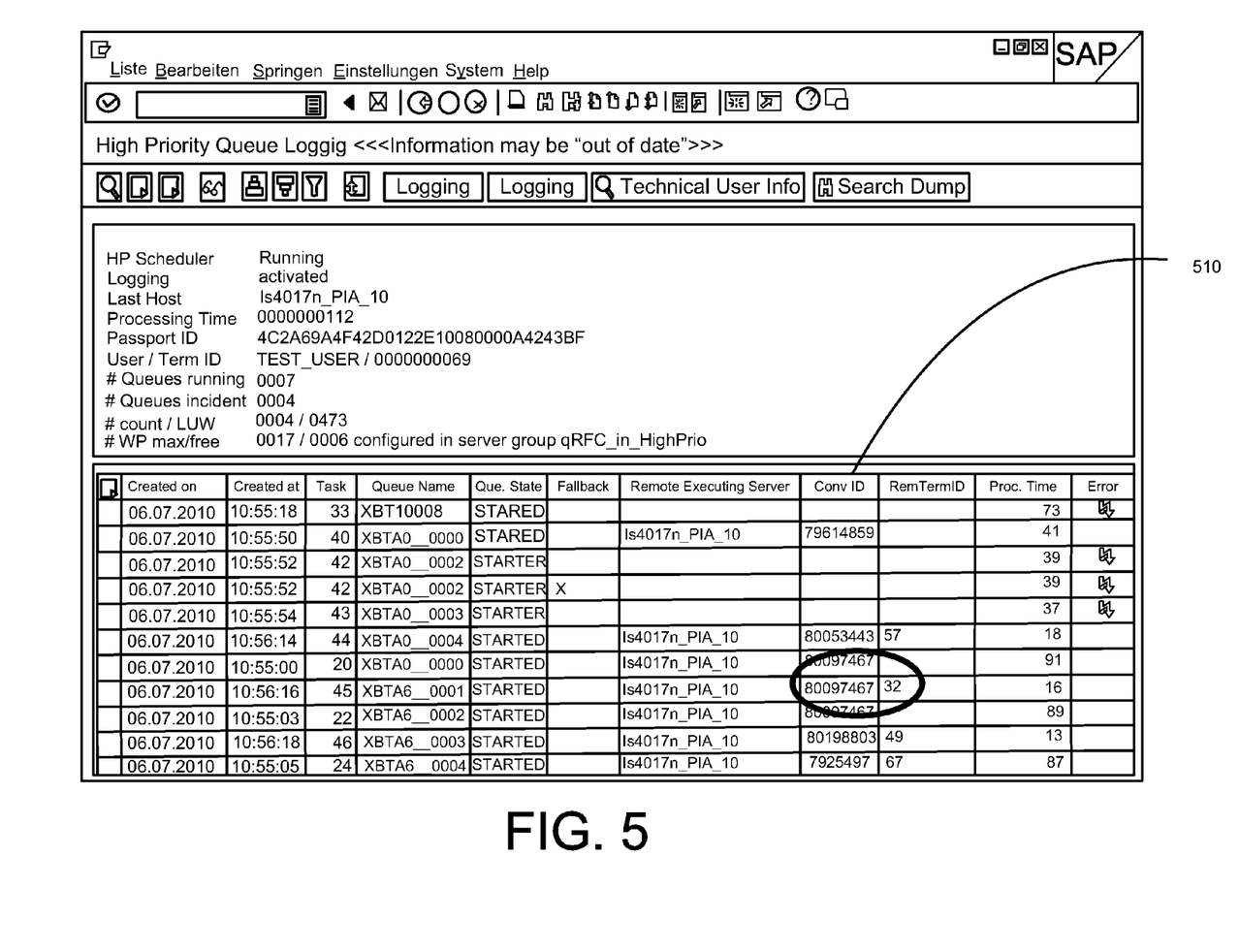
FIGS. 5-9 are screen shots illustrating an implementation for logging a scheduler.

As illustrated in FIG. 5, a system administrator or other user may use the entry for conversion identification (Conv ID) 510 and navigate to the transaction SM5A to setup the RFC business chain and identify the communication partner. In this case, as illustrated in FIG. 6, the RFC destination A1_RUNTIME_JCOSERVER is connected to Java service via Jco connector for conversion identification 80097467.

Figure 6:
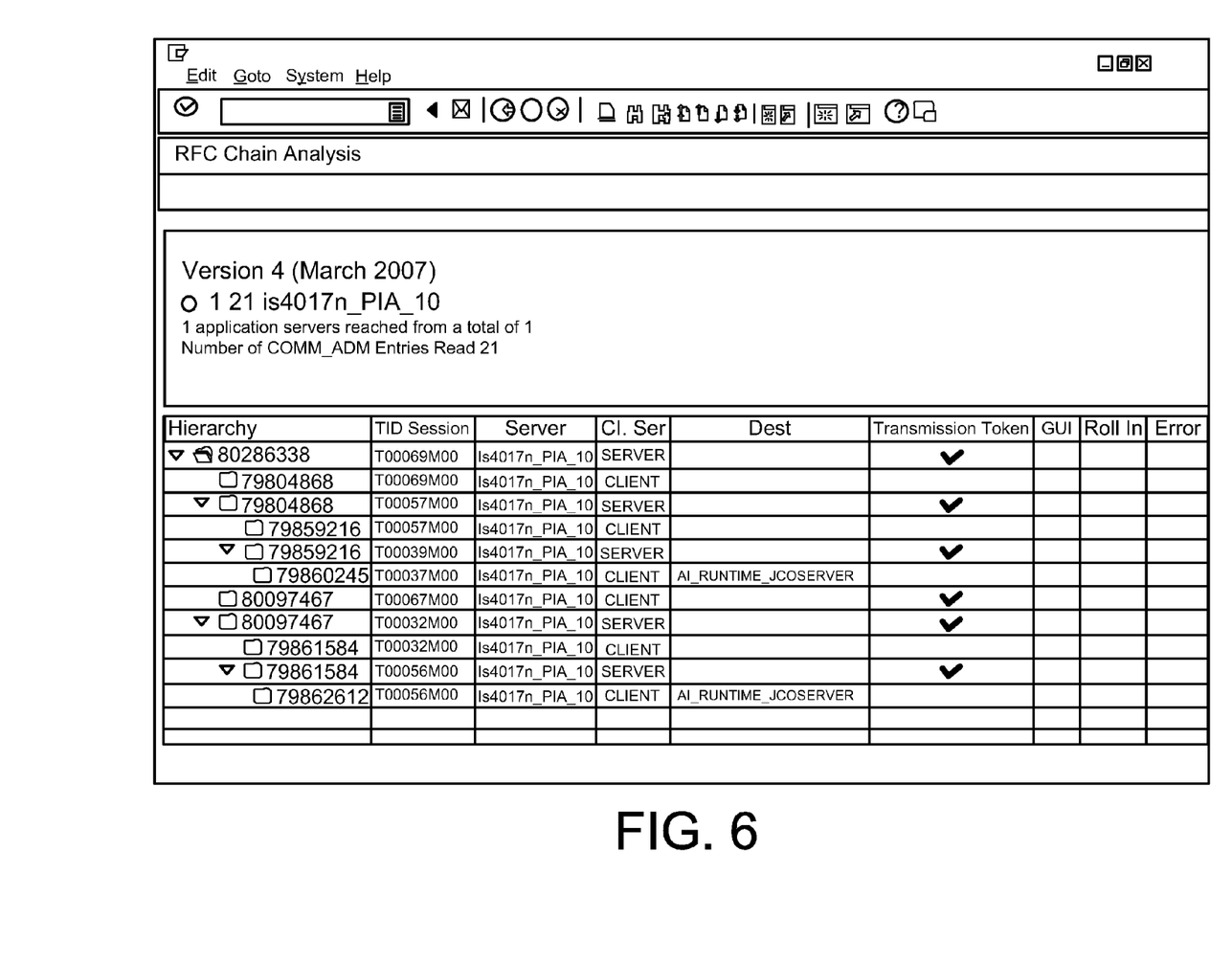

The business chain, as illustrated in FIG. 6, shows the RFC client and server part in an RFC chain. The RFC connection with conversation ID 80097467 was called by high priority scheduler (conversation ID 80286338) and it has called the J2EE service via Jco and RFC destination AI_RUNTIME_J-COSERVER with conversation ID 79862612. The same information can be shown in communication table if you use the transaction SM51→Server Name→Information→Communication Table and search for the conversation ID 79862612.

Figure 7:
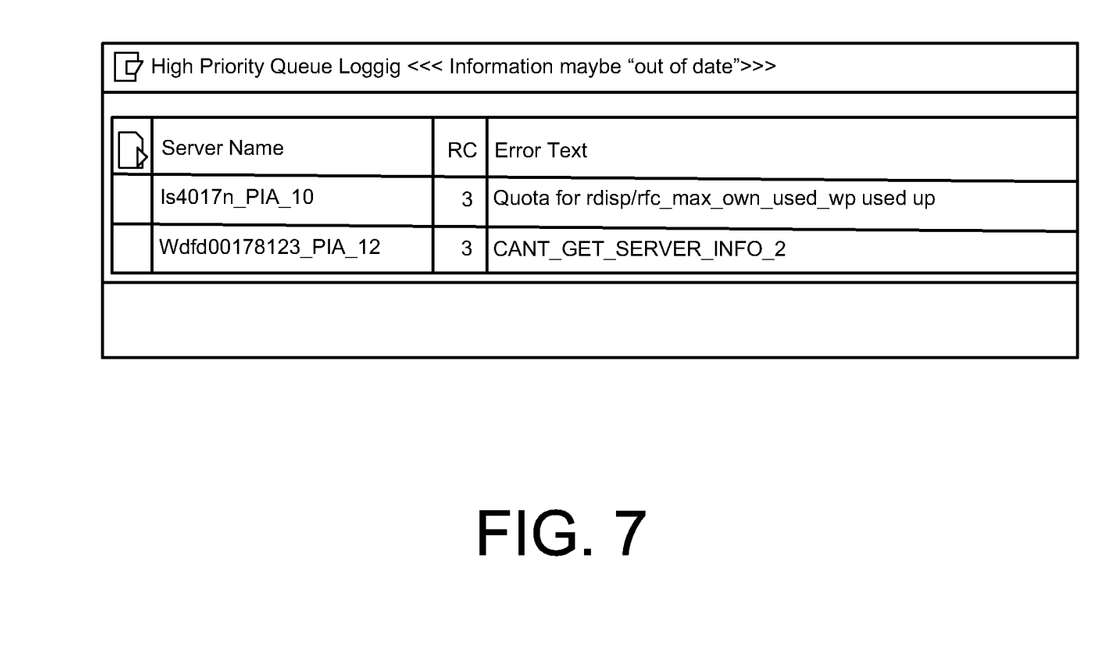

As further information, in some embodiments, the system administrator can find the error text in case of errors. FIG. 7 illustrates a resource failure error text while PI message processing (the error text can be displayed by clicking on the error symbol).

In some embodiments, Return Code (RC) 3 indicates that the resource failure while starting of high priority queue via asynchronous RFC with reply; RC 2 indicates system failure; and RC 1 presents the communication failure error.

Figure 8:
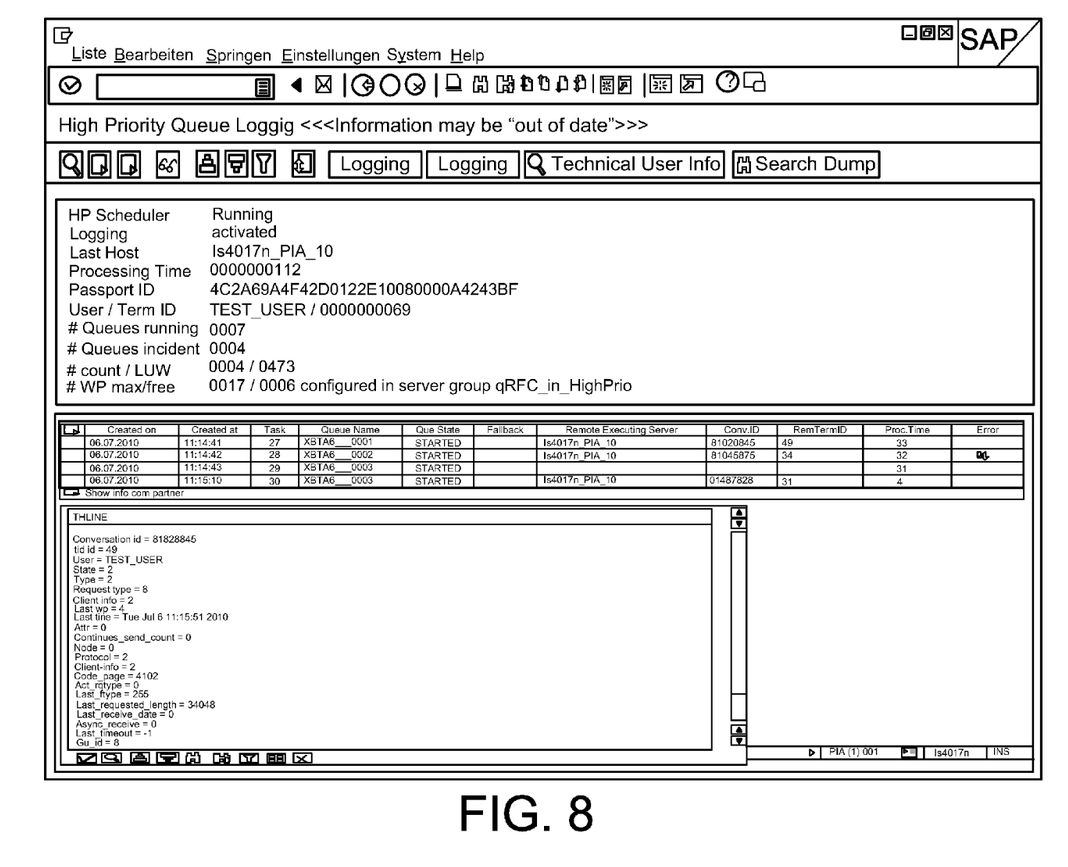

In order to find the detailed technical information about the RFC server session in every specific queue name, in some embodiments, the system administrator can press on the "remote Terminal ID" and get detailed information about the RFC server session. As best illustrated in FIG. 8, one can thus find out in which dialog work process the RFC server session was rolled in the last action. The last action can be display and more detailed information from basis point of view.

Figure 9:
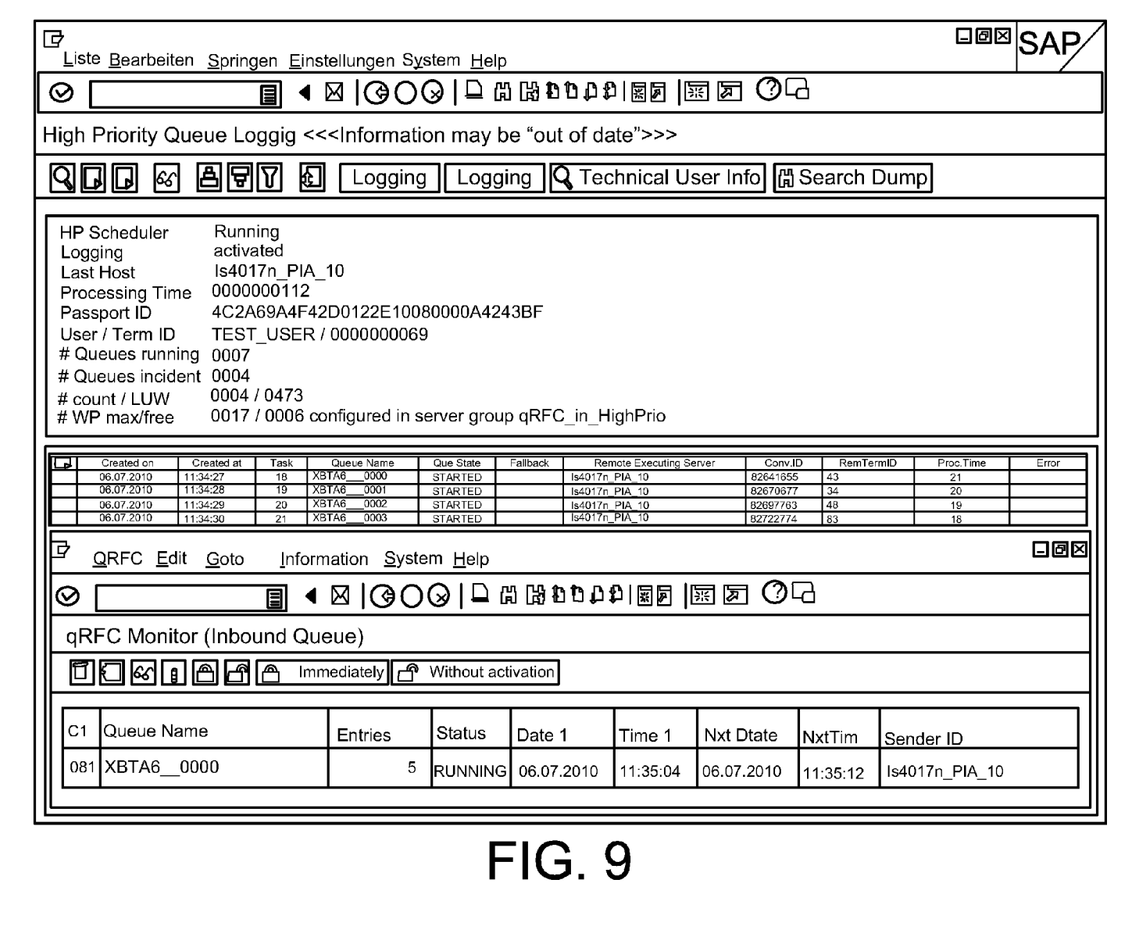

As illustrated in FIG. 9, in some embodiments, the navigation to SMQ2 transaction is also possible to get the current status of PI specific queue name (by clicking on the queue name, one can jump into SMQ2).

In some embodiments, the exception analysis can be performed using at least one of the following KPIs:
a. Using transaction ID from global information is possible to collect the ST05 SQL data records and ABAP traces
b. Using user name in high priority scheduler logging one can search for incidents in ABAP system log (integration of automatically selection in ABAP system log in processing) and find the reason for incidents
c. Search for ABAP runtime error can be found
d. Using transaction ID, it is possible to search for statistical data records and use the SAP solution manager for exception and trace analysis Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including instructions recorded on a non-transitory computer-readable storage medium, the instructions being readable and executable by at least one processor of a computing device, the system comprising:
   a plurality of schedulers including a high priority scheduler and a low priority scheduler;
   a logging module, including a memory, configured to cause the at least one processor to log information associated with activity of at least the high priority scheduler of the plurality of schedulers and one or more queues operatively coupled to each of the high priority scheduler and the low priority scheduler, wherein the logging module is configured to:
      cause the at least one processor to log global information associated with the high priority scheduler, including at least one of a user for which the high priority scheduler is running, a processing time of the high priority scheduler, a passport ID of the high priority scheduler, available resources of the high priority scheduler, or a status of the high priority scheduler;
      cause the at least one processor to log information associated with runtime behavior of the one or more queues, including at least one of queue status, queue name of a specific inbound queue of the high priority scheduler, processing time associated with specific queue names started by the high priority scheduler and corresponding conversation IDs, or root cause analysis of incidents and error notifications; and
      search SQL data records and Advanced Business Application Program (ABAP) traces using a transaction ID provided with the global information of the high priority scheduler to identify incidents and generate corresponding error notifications;
   a receiving module configured to receive a request for the information associated with at least one of the plurality of schedulers; and
   a transmission module configured to transmit the information associated with at least one of the plurality of schedulers.

2. The system of claim 1, wherein the receiving module is configured to receive a request for information associated with at least one of the plurality of schedulers from a third party via a network connection.

3. The system of claim 1, wherein the transmission module is configured to transmit information associated with at least one of the plurality of schedulers to a third party via a network connection.

4. The system of claim 1, wherein each of the one or more queues are operatively coupled to each of the plurality of schedulers including each of the high priority scheduler and the low priority scheduler.

5. The system of claim 1, wherein each of the plurality of schedulers including each of the high priority scheduler and the low priority scheduler are operatively coupled to at least one application server, the high priority scheduler being operatively coupled to each of the one or more queues and a first application server, the low priority scheduler being operatively coupled to each of the one or more queues and a second application server different than the first application server.

6. The system of claim 1, wherein messages are stored in the one or more queues for processing by the plurality of schedulers, the high priority scheduler is configured to process high priority messages of the messages stored in the one or more queues, and the low priority scheduler is configured to process low priority messages of the messages stored in the one or more queues.

7. The system of claim 1, wherein the information associated with the plurality of schedulers includes global information about each of the schedulers.

8. The system of claim 1, wherein the information associated with the plurality of schedulers includes at least one of (a) an identification of a user for which each of the schedulers is running, (b) processing time of each of the schedulers, (c)

an identification of an application server where each of the schedulers is running, and (d) a status of each of the schedulers.

9. The system of claim 1, wherein the information associated with the plurality of schedulers includes information regarding a runtime behavior of queue names that are associated with each of the schedulers.

10. The system of claim 1, wherein the information associated with the activity of at least the high priority scheduler of the plurality of schedulers includes processing time of each of the one or more queues operatively coupled to each of the plurality of schedulers.

11. The system of claim 1, wherein the information associated with the activity of at least the high priority scheduler of the plurality of schedulers includes root cause analysis of incidents and presentation of error texts in case of error.

12. The system of claim 1, wherein the information associated with the activity of at least the high priority scheduler of the plurality of schedulers includes reasons for processing delays related to a runtime behavior of at least the high priority scheduler of the plurality of schedulers and each of the one or more queues operatively coupled to each of the plurality of schedulers.

13. The system of claim 1, wherein the logging module is configured to search ABAP system logs for incidents and identify a root cause for identified incidents using a user name for which the high priority scheduler is performing processing.

14. The system of claim 1, wherein the logging module is configured to search statistical data records to identify incidents using a transaction ID provided with the global information of the high priority scheduler.

15. A computer-implemented method for causing at least one processor of a computing device to execute instructions recorded on a non-transitory computer-readable storage medium, the method comprising:
  logging information associated with activity of a plurality of schedulers including a high priority scheduler of the plurality of schedulers and a low priority scheduler of the plurality of schedulers, and one or more queues operatively coupled to each of the high priority scheduler and the low priority scheduler, including:
    logging global information associated with the high priority scheduler, including at least one of a user for which the high priority scheduler is running, a processing time of the high priority scheduler, a passport ID of the high priority scheduler, available resources of the high priority scheduler, or a status of the high priority scheduler;
    logging information associated with runtime behavior of the one or more queues, including at least one of queue status, queue name of a specific inbound queue of the high priority scheduler, processing time associated with specific queue names started by the high priority scheduler and corresponding conversation IDs, or root cause analysis of incidents and error notifications; and
    searching SQL data records and Advanced Business Application Program (ABAP) traces using a transaction ID provided with the global information of the high priority scheduler to identify incidents and generate corresponding error notifications;
  receiving a request for information associated with at least one of the plurality of schedulers; and
  transmitting information associated with at least one of the plurality of schedulers.

16. The method of claim 15, wherein the receiving includes receiving a request for information associated with at least one of the plurality of schedulers from a third party via a network connection.

17. The method of claim 15, wherein the transmitting includes transmitting information associated with at least one of the plurality of schedulers to a third party via a network connection.

18. The method of claim 15, wherein each of the plurality of schedulers including each of the high priority scheduler and the low priority scheduler are operatively coupled to at least one application server, the high priority scheduler being operatively coupled to each of the one or more queues and a first application server, the low priority scheduler being operatively coupled to each of the one or more queues and a second application server different than the first application server.

19. The method of claim 15, wherein the logging information associated with a scheduler includes logging information associated with at least one of (a) an identification of a user for which each of the schedulers is running, (b) processing time of each of the schedulers, (c) an identification of an application server where each of the schedulers is running, and (d) a status of each of the schedulers.

20. The method of claim 15, wherein the logging information associated with the plurality of schedulers includes logging information associated with a runtime behavior of queue names that are associated with each of the schedulers.

21. A computer program product, the computer program product being tangibly embodied on a non-transitory computer-readable storage medium and comprising instructions that, when executed by at least one processor of a computing device, are configured to cause the at least one processor of the computing device to:
  log information associated with activity of a plurality of schedulers including a high priority scheduler of the plurality of schedulers and a low priority scheduler of the plurality of schedulers, and one or more queues operatively coupled to each of the high priority scheduler and the low priority scheduler, including:
    log global information associated with the high priority scheduler, including at least one of a user for which the high priority scheduler is running, a processing time of the high priority scheduler, a passport ID of the high priority scheduler, available resources of the high priority scheduler, or a status of the high priority scheduler;
    log information associated with runtime behavior of the one or more queues, including at least one of queue status, queue name of a specific inbound queue of the high priority scheduler, processing time associated with specific queue names started by the high priority scheduler and corresponding conversation IDs, or root cause analysis of incidents and error notifications; and
    search Advanced Business Application Program (ABAP) system logs for incidents and identify a root cause for identified incidents using a user name for which the high priority scheduler is performing processing;
  receive a request for information associated with at least one of the plurality of schedulers; and
  transmit information associated with at least one of the plurality of schedulers.

22. The computer program product of claim 21, wherein each of the plurality of schedulers including each of the high priority scheduler and the low priority scheduler are operatively coupled to at least one application server, the high priority scheduler being operatively coupled to a each of the one or more queues and a first application server, the low priority scheduler being operatively coupled to each of the one or more queues and a second application server different than the first application server.

23. The computer program product of claim 21, wherein the information associated with the plurality of schedulers includes at least one of (a) an identification of a user for which each of the schedulers is running, (b) processing time of each of the schedulers, (c) an identification of an application server where each of the schedulers is running, and (d) a status of each of the schedulers.

24. The computer program product of claim 21, wherein messages are stored in the one or more queues for processing by the plurality of schedulers, the high priority scheduler is configured to process high priority messages of the messages stored in the one or more queues, and the low priority scheduler is configured to process low priority messages of the messages stored in the one or more queues.

25. The computer program product of claim 21, wherein the information associated with the plurality of schedulers includes information regarding a runtime behavior of queue names that are associated with each of the schedulers.

* * * * *